US012230884B2

(12) United States Patent
Zhao et al.

(10) Patent No.: US 12,230,884 B2

(45) Date of Patent: Feb. 18, 2025

(54) OMNIDIRECTIONAL DUAL-POLARIZED ANTENNA AND COMMUNICATIONS DEVICE

(71) Applicant: Huawei Technologies Co., Ltd., Shenzhen (CN)

(72) Inventors: Shuchen Zhao, Chengdu (CN); Mingyang Li, Chengdu (CN); Hao Li, Chengdu (CN); Wenqing Dong, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 351 days.

(21) Appl. No.: 17/738,398

(22) Filed: May 6, 2022

(65) Prior Publication Data

US 2022/0263252 A1 Aug. 18, 2022

Related U.S. Application Data

(63) Continuation of application No. PCT/CN2019/116379, filed on Nov. 7, 2019.

(51) Int. Cl.

*H01Q 21/28* (2006.01)
*H01Q 1/48* (2006.01)
*H01Q 15/24* (2006.01)

(52) U.S. Cl.

CPC ............... *H01Q 21/28* (2013.01); *H01Q 1/48* (2013.01); *H01Q 15/24* (2013.01)

(58) Field of Classification Search

CPC .. H01Q 1/24; H01Q 1/38; H01Q 1/48; H01Q 15/24; H01Q 21/24; H01Q 21/28; H01Q 7/00; H01Q 9/40

See application file for complete search history.

(56) References Cited

U.S. PATENT DOCUMENTS 5,300,936 A 4/1994 Izadian
9,209,526 B2 12/2015 Gao et al.
(Continued)

FOREIGN PATENT DOCUMENTS

CN 102447163 A 5/2012
CN 204885419 U 12/2015
(Continued)

OTHER PUBLICATIONS

Liu, J. et al., "Design and Analysis of Low-Profile and Broadband Microstrip Monopolar Patch Antenna," IEEE Transactions on Antennas and Propagation, vol. 61, No. 1, Jan. 2013, 8 pages.
(Continued)

*Primary Examiner* — Thien M Le

(74) *Attorney, Agent, or Firm* — Slater Matsil, LLP

(57) ABSTRACT

This application provides an omnidirectional dual-polarized antenna and a communications device. The omnidirectional dual-polarized antenna includes a first printed circuit board, a feeding structure, a feeding strip, and grounding strips. A metal ring structure and a metal disc structure are arranged on the first printed circuit board, and the metal ring structure surrounds the metal disc structure. The feeding structure is perpendicular to the first printed circuit board and connected to the metal ring structure. The feeding strip is perpendicular to the first printed circuit board and connected to a central point of the metal disc structure. The grounding strips are each perpendicular to the first printed circuit board and connected to the metal disc structure. The metal ring structure and the feeding structure form a horizontally polarized unit, and the metal disc structure, the feeding strip, and the grounding strips form a vertically polarized unit.

20 Claims, 7 Drawing Sheets

(56) References Cited

U.S. PATENT DOCUMENTS

| | | | | |
|---|---|---|---|---|
| 2002/0089392 | A1* | 7/2002 | Horio | H01P 1/387 333/24.2 |
| 2011/0279342 | A1 | 11/2011 | Takahashi et al. | |
| 2013/0222202 | A1 | 8/2013 | Lam | |
| 2015/0188226 | A1* | 7/2015 | Ng | H01Q 9/42 343/862 |
| 2015/0214629 | A1 | 7/2015 | Hagiwara et al. | |
| 2016/0255733 | A1* | 9/2016 | Jung | G06F 1/1633 361/759 |
| 2016/0339203 | A1* | 11/2016 | Krames | H05B 47/16 |
| 2018/0006380 | A1* | 1/2018 | Lo Hine Tong | H01Q 13/085 |
| 2020/0287297 | A1* | 9/2020 | Boutayeb | H01Q 1/36 |
| 2020/0313299 | A1* | 10/2020 | Jia | H01Q 5/378 |
| 2022/0336966 | A1* | 10/2022 | Kato | H04B 17/27 |
| 2023/0336256 | A1* | 10/2023 | Sekiya | G01S 5/14 |
| 2023/0359989 | A1* | 11/2023 | Yasumura | G06Q 10/087 |

FOREIGN PATENT DOCUMENTS

| | | | |
|---|---|---|---|
| CN | 105789913 | A | 7/2016 |
| CN | 106329154 | A | 1/2017 |
| CN | 107154528 | A | 9/2017 |
| CN | 109411903 | A | 3/2019 |
| JP | S5763941 | A | 4/1982 |
| TW | M395268 | U | 12/2010 |

OTHER PUBLICATIONS

Young-Pyo Hong et al: “S-band dual-path dual-polarized antenna system for satellite digital audio radio service (SDARS) application”, IEEE Transactions on Microwave Theory and Techniques, vol. 54, No. 4, Jun. 1, 2006 (Jun. 1, 2006), pp. 1569-1575, XP093135107.

Hong Y.-P. et al: “Low-Profile S-BandDual-Polarized Antenna for SDARS Application”, IEEE Antennas and Wireless Propagation Letters, vol. 4, Jan. 1, 2005 (Jan. 1, 2005), total pp. 4, XP093135105.

* cited by examiner

OMNIDIRECTIONAL DUAL-POLARIZED ANTENNA AND COMMUNICATIONS DEVICE

CROSS-REFERENCE TO RELATED APPLICATIONS

This application is a continuation of International Application No. PCT/CN2019/116379, filed on Nov. 7, 2019, the disclosure of which is hereby incorporated by reference in its entirety.

TECHNICAL FIELD

This application relates to a wireless communications technology, and in particular, to an omnidirectional dual-polarized antenna and a communications device.

BACKGROUND

Indoor digitalization has become the current development trend of mobile internet. Due to limited space, it is usually required to arrange small cells indoors, which feature relatively low power and a relatively small size. With the development of a communications system to 5G, a quantity of transceiving channels has to be increased for indoor small cells to meet higher bandwidth requirements. However, due to a limitation by a size of an entire machine, a quantity of antennas that can be built into small cells is close to an upper limit. If more antenna units are integrated into the small cells, a spacing between antenna units cannot be ensured, and mutual coupling of the antenna units is excessively strong. As a result, expected benefits of performance of the small cells cannot be achieved. In addition, costs of the small cells increase linearly with an increase of a quantity of antennas. More antennas indicate higher costs, which affects a commercial application of the small cells.

In a related technology, an omnidirectional dual-polarized antenna is a choice that can reduce a quantity and costs of antennas and ensure performance. For example, in a common solution, an omnidirectional dual-polarized antenna includes a horizontally polarized unit and a vertically polarized unit, where the horizontally polarized unit includes four dipoles or folded dipoles. Two arms of each dipole or folded dipole are arranged on a front side and a rear side of a printed circuit board (PCB) respectively, and the four dipoles or folded dipoles are rotationally symmetrical. Feeding is performed from a center of the PCB to the horizontally polarized unit. Specifically, equal-amplitude and in-phase feeding is performed from a one-to-four power divider to the four dipoles or folded dipoles of the horizontally polarized unit, so that the four dipoles or folded dipoles generate omnidirectional horizontal polarized radiation. The vertically polarized unit has a cone-shaped or bowl-shaped structure, where the cone-shaped or bowl-shaped structure is directly fed by a coaxial inner core from system ground. When feeding is performed on the cone-shaped or bowl-shaped structure, a current is evenly distributed on a side wall of the cone-shaped or bowl-shaped structure, radiation generated by the current in each horizontal direction counteracts each other, and radiation generated in a vertical direction overlaps each other, thereby generating omnidirectional vertical polarized radiation.

However, an aperture size of the horizontally polarized unit of the foregoing omnidirectional dual-polarized antenna is large, which usually requires a transverse size of 0.6λ or more (λ is a wavelength of an electromagnetic wave in a working frequency band of the antenna). This leads to a relatively large transverse size of the antenna, which is not conducive to integration into a multi-antenna device. In addition, the horizontally polarized unit and the vertically polarized unit have independent structures, which not only requires a plurality of processing technologies, but also cannot implement a conformal antenna design, resulting in an increase in costs.

SUMMARY

This application provides an omnidirectional dual-polarized antenna and a communications device to overcome problems that a transverse size of an antenna is relatively large, which is not conducive to integration into a multi-antenna device, and because a horizontally polarized unit and a vertically polarized unit of the antenna have independent structures, more processing technologies are required, a conformal antenna design cannot be implemented, and costs are high.

According to a first aspect, this application provides an omnidirectional dual-polarized antenna, including: a first printed circuit board, a feeding structure, a feeding strip, and grounding strips, where a metal ring structure and a metal disc structure are arranged on the first printed circuit board, the metal ring structure surrounds the metal disc structure, the feeding structure is perpendicular to the first printed circuit board and connected to the metal ring structure, the feeding strip is perpendicular to the first printed circuit board and connected to a central point of the metal disc structure, the grounding strips are each perpendicular to the first printed circuit board and connected to the metal disc structure, the metal ring structure and the feeding structure form a horizontally polarized unit, and the metal disc structure, the feeding strip, and the grounding strips form a vertically polarized unit.

In a possible implementation, the antenna further includes a plurality of second printed circuit boards, and the plurality of second printed circuit boards are perpendicular to the first printed circuit board, where the feeding structure is arranged on one of the second printed circuit boards, the feeding strip is arranged on another second printed circuit board, and the grounding strips are arranged on the second printed circuit boards other than the second printed circuit boards on which the feeding structure and the feeding strip are arranged.

In a possible implementation, the feeding structure includes two parallel strips, where one of the strips is used for feeding the metal ring structure, and the other strip is used for grounding.

In a possible implementation, the metal ring structure includes a first ring structure, and the first ring structure includes at least one gap.

In a possible implementation, the metal ring structure includes a first ring structure and a second ring structure, where the first ring structure is arranged inside the second ring structure, both the first ring structure and the second ring structure include a plurality of coupling strips, and a gap is arranged between two adjacent coupling strips.

In a possible implementation, lengths of the coupling strips in the first ring structure are all equal, and lengths of the coupling strips in the second ring structure are all equal.

In a possible implementation, a shape of the metal ring structure includes a circle, a square, a polygon, an asymmetric shape, or an irregular shape.

In a possible implementation, if the shape of the metal ring structure is the asymmetric shape, the metal ring structure includes a first semi-elliptical structure and a second semi-elliptical structure, and a long axis of the first semi-elliptical structure and a short axis of the second semi-elliptical structure coincide.

In a possible implementation, the metal disc structure is provided with a plurality of gaps.

In a possible implementation, the metal disc structure is provided with an annular gap, the annular gap divides the metal disc structure into a first structure and a second structure, and the first structure surrounds the second structure.

In a possible implementation, a shape of the first structure includes a circular ring or a square ring, and a shape of the second structure includes a circle, a square, a polygon, or an irregular shape.

In a possible implementation, one end of the feeding strip is connected to a point on the second structure, the point is a central point of the first structure, and one end of each of the grounding strips is connected to an edge of the first structure.

In a possible implementation, the first structure includes a plurality of coupling strips, a gap is arranged between two adjacent coupling strips, and an edge of each of the coupling strips is connected to one grounding strip.

According to a second aspect, this application provides a communications device, including the omnidirectional dual-polarized antennas according to any one of the first aspect or the possible implementations.

In a possible implementation, the device includes at least four omnidirectional dual-polarized antennas, and the at least four omnidirectional dual-polarized antennas are arranged at four corners of the device respectively.

In the omnidirectional dual-polarized antenna according to this application, because the metal ring structure and the metal disc structure are both arranged on the first printed circuit board, and the feeding structure, the feeding strip, and the grounding strips are perpendicular to the first printed circuit board, an omnidirectional horizontally-polarized wave is generated through feeding to the metal ring structure by using the feeding structure, and an omnidirectional vertically-polarized wave is generated through feeding to the vertically polarized unit by using the feeding strip, thereby generating an omnidirectional dual-polarized wave.

Because a current on the metal disc structure in the vertically polarized unit is evenly distributed from a center to the outside of the metal disc structure, current radiation in a horizontal direction counteracts each other, so that coupling between the horizontally polarized unit and the vertically polarized unit is reduced, thereby ensuring isolation between horizontal polarization and vertical polarization, and further ensuring respective performance of the horizontally polarized unit and the vertically polarized unit.

By arranging the metal disc structure and connecting the feeding strip in the vertically polarized unit to the metal disc structure, a height of the feeding strip can be reduced, thereby reducing a height of the vertically polarized unit, and further reducing a height of the omnidirectional dual-polarized antenna.

By adding the grounding strips in the vertically polarized unit, the metal disc structure is short-circuited with a ground wire, to introduce parallel inductance, so as to achieve an effect of weakening capacitance of the vertically polarized unit and optimizing impedance.

Because the metal ring structure in the horizontally polarized unit surrounds the metal disc structure in the vertically polarized unit, that is, the vertically polarized unit is nested inside the horizontally polarized unit, a transverse size of the omnidirectional dual-polarized antenna is greatly reduced.

Because the metal disc structure and the metal ring structure are both arranged on the first printed circuit board, and the metal disc structure is arranged inside the metal ring structure, that is, the horizontally polarized unit and the vertically polarized unit are arranged on the first printed circuit board in a mutually nested manner, a conformal antenna design of the horizontally polarized unit and the vertically polarized unit is implemented, so as to reduce the height of the horizontally polarized unit to be the same as that of the vertically polarized unit. Compared with an existing omnidirectional dual-polarized antenna with a horizontally polarized unit and a vertically polarized unit separated, the omnidirectional dual-polarized antenna does not need an interval in height, and the size of the omnidirectional dual-polarized antenna in vertical height is reduced.

Because the conformal antenna design of the horizontally polarized unit and the vertically polarized unit is implemented, various processing technologies are not needed, which facilitates processing and reduces costs.

In a conventional technology, the horizontally polarized unit needs a separately arranged power divider feed network, which makes an entire structure of an antenna complex. However, in this application, the horizontally polarized unit can be fed by using only the feeding structure, which greatly simplifies the structure of the omnidirectional dual-polarized antenna and further reduces the costs.

DETAILED DESCRIPTION OF ILLUSTRATIVE EMBODIMENTS

The following describes technical solutions of this application with reference to the accompanying drawings. It is clearly that the described embodiments are some rather than all of the embodiments of this application. All other embodiments obtained by a person of ordinary skill in the art based on the embodiments of this application without creative efforts shall fall within the protection scope of this application.

In the embodiments, claims, and the accompanying drawings of this specification in this application, terms "first", "second" and the like are only used for a purpose of distinguishing between descriptions, and cannot be understood as indicating or implying relative importance or indicating or implying a sequence. Moreover, terms "include", "have", and any other variant thereof are intended to cover a non-exclusive inclusion, for example, including a series of steps or units. Methods, systems, products, or devices are not necessarily limited to those explicitly listed steps or units, but may include other steps or units that are not explicitly listed or that are inherent to such processes, methods, products, or devices.

It should be understood that, in this application, "at least one (item)" means one or more, and "a plurality of" means two or more. The term "and/or" is used to describe an association relationship between associated objects, and indicates that three relationships may exist. For example, "A and/or B" may indicate the following three cases: Only A exists, only B exists, and both A and B exist, where A and B may be singular or plural. The character "/" generally indicates an "or" relationship between the associated objects. "At least one of the following" or a similar expression thereof indicates any combination of the following, including any combination of one or more of the following. For example, at least one (piece) of a, b, or c may represent: a, b, c, "a and b", "a and c", "b and c", or "a, b, and c", where a, b, and c may be singular or plural.

Figure 1:
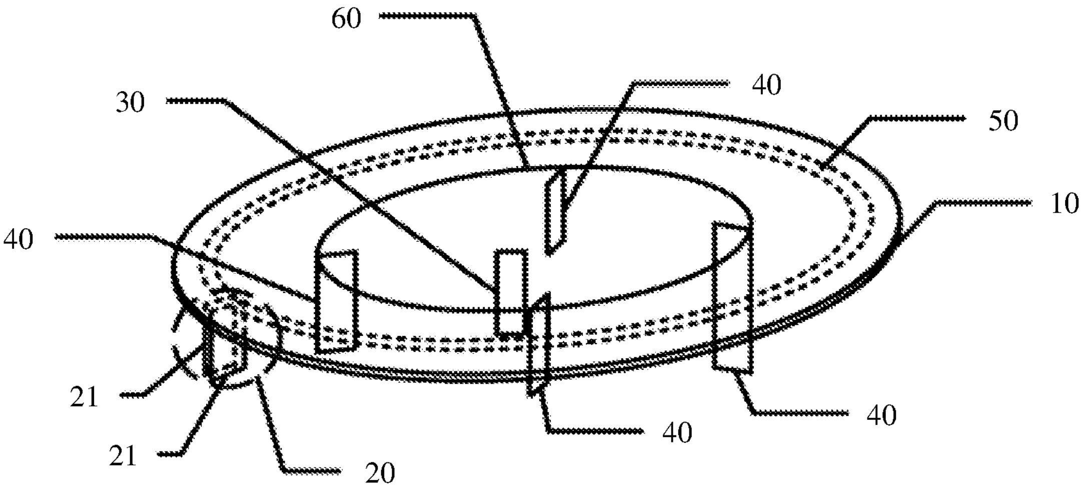
FIG. 1 is a schematic diagram of a structure of an embodiment of an omnidirectional dual-polarized antenna according to this application.

FIG. 1 is a schematic diagram of a structure of an embodiment of an omnidirectional dual-polarized antenna according to this application. As shown in FIG. 1, the omnidirectional dual-polarized antenna in this embodiment may include: a first printed circuit board 10, a feeding structure 20, a feeding strip 30, and grounding strips 40, where a metal ring structure 50 and a metal disc structure 60 are arranged on the first printed circuit board 10, and the metal ring structure 50 surrounds the metal disc structure 60. In other words, the metal disc structure 60 is arranged in a hollow region of the metal ring structure 50. The feeding structure 20 is perpendicular to the first printed circuit board 10 and connected to the metal ring structure 50, the feeding strip 30 is perpendicular to the first printed circuit board 10 and connected to a central point of the metal disc structure 60 (for example, a geometric center of the metal disc structure 60), the grounding strips 40 are each perpendicular to the first printed circuit board 10 and connected to the metal disc structure 60, the metal ring structure 50 and the feeding structure 20 form a horizontally polarized unit, and the metal disc structure 60, the feeding strip 30, and the grounding strips 40 form a vertically polarized unit.

In the horizontally polarized unit, the feeding structure 20 feeds the metal ring structure 50, and the metal ring structure 50 generates a current along the metal ring structure 50 (that is, in a horizontal direction), thereby generating an omnidirectional horizontally-polarized wave. In the vertically polarized unit, the feeding strip 30 feeds the vertically polarized unit, and a current in a vertical direction is generated on the feeding strip 30 and the grounding strips 40, thereby generating an omnidirectional vertically-polarized wave. In conclusion, an omnidirectional dual-polarized wave is generated by using the horizontally polarized unit and the vertically polarized unit.

Because a current on the metal disc structure 60 in the vertically polarized unit is evenly distributed from a center to the outside of the metal disc structure 60, current radiation in a horizontal direction counteracts each other, so that coupling between the horizontally polarized unit and the vertically polarized unit is reduced, thereby ensuring isolation between horizontal polarization and vertical polarization, and further ensuring respective performance of the horizontally polarized unit and the vertically polarized unit.

By arranging the metal disc structure 60 and connecting the feeding strip 30 in the vertically polarized unit to the metal disc structure 60, a height of the feeding strip 30 can be reduced, thereby reducing a height of the vertically polarized unit, and further reducing a height of the omnidirectional dual-polarized antenna. By adding the grounding strips 40 in the vertically polarized unit, the metal disc structure 60 is short-circuited with a ground wire, to introduce parallel inductance, so as to achieve an effect of weakening capacitance of the vertically polarized unit and optimizing impedance.

Because the metal ring structure 50 in the horizontally polarized unit surrounds the metal disc structure 60 in the vertically polarized unit, that is, the vertically polarized unit is nested inside the horizontally polarized unit, a transverse size of the omnidirectional dual-polarized antenna is greatly reduced.

Because the metal disc structure 60 and the metal ring structure 50 are both arranged on the first printed circuit board 10, and the metal disc structure 60 is arranged inside the metal ring structure 50, that is, the horizontally polarized unit and the vertically polarized unit are arranged on the first printed circuit board in a mutually nested manner, a conformal antenna design of the horizontally polarized unit and the vertically polarized unit is implemented, so as to reduce the height of the horizontally polarized unit to be the same as that of the vertically polarized unit. Compared with an existing omnidirectional dual-polarized antenna with a horizontally polarized unit and a vertically polarized unit separated, the omnidirectional dual-polarized antenna does not need an interval in height, and the size of the omnidirectional dual-polarized antenna in vertical height is reduced.

Because the conformal antenna design of the horizontally polarized unit and the vertically polarized unit is implemented, various processing technologies are not needed, which facilitates processing and reduces costs.

In a conventional technology, the horizontally polarized unit needs a separately arranged power divider feed network, which makes an entire structure of an antenna complex.

However, in this application, the horizontally polarized unit can be fed by using only the feeding structure 20, which greatly simplifies the structure of the omnidirectional dual-polarized antenna and further reduces the costs.

The feeding structure 20 may have a balanced feeding structure, where the balanced feeding structure includes two feeding strips, and currents on the two feeding strips are equal in magnitude and opposite in direction. In an implementation, the feeding structure 20 may include two parallel strips 21, that is, the feeding structure 20 has a parallel double-wire structure in a balanced feeding structure, where one of the strips 21 is used for feeding the metal ring structure 50, and the other strip 21 is used for grounding.

The two parallel strips 21 may be made of a metal material such as copper, aluminum, gold, or silver, which is not particularly limited in this embodiment. The two parallel strips 21 each may include a metal wire, a metal strip, a feeder, or the like.

The feeding strip 30 and the grounding strips 40 each may be made of a metal material such as copper, aluminum, gold, or silver, which is not particularly limited in this embodiment. The feeding strip 30 and the grounding strips 40 each may include a metal wire, a metal strip, a feeder, or the like.

A quantity of the grounding strips 40 may be set according to actual requirements, which is not particularly limited in this embodiment. Positions at which the grounding strips 40 are connected to the metal disc structure 60 may be edge positions of the metal disc structure 60. Specifically, when a plurality of grounding strips 40 are provided, the plurality of grounding strips 40 may be connected to the edge positions of the metal disc structure 60 and evenly distributed in an edge region of the metal disc structure 60. It should be noted that connection positions between the grounding strips 40 and the metal disc structure 60 are only examples, and are not used to limit the present invention. For example, four grounding strips 40 are provided, and are connected to edge positions of the metal disc structure 60 respectively and evenly distributed in an edge region of the metal disc structure 60.

The feeding structure 20, the feeding strip 30, and the grounding strips 40 may be arranged in the following two manners.

In the first manner, the feeding structure 20 is perpendicular to the first printed circuit board 10 in an independent manner and connected to the metal ring structure 50, and the feeding strip 30 and the grounding strips 40 are also perpendicular to the first printed circuit board 10 in an independent manner and connected to the metal disc structure 60. The independent manner herein means that the feeding structure 20, the feeding strip 30, and the grounding strips 40 are not attached to any medium.

In the second manner, the feeding structure 20, the feeding strip 30, and the grounding strips 40 are attached to a medium and are perpendicular to the first printed circuit board 10. Specifically, the medium may be second printed circuit boards, that is, a plurality of second printed circuit boards may be provided, and the plurality of second printed circuit boards are perpendicular to the first printed circuit board 10, where the feeding structure 20 is arranged on one of the second printed circuit boards, the feeding strip 30 is arranged on another second printed circuit board, the grounding strips 40 are arranged on the second printed circuit boards other than the second printed circuit boards on which the feeding structure 20 and the feeding strip 30 are arranged, and one grounding strip 40 corresponds to one second printed circuit board. On this basis, the two parallel strips 21 in the feeding structure 20 may be arranged on a front surface and a rear surface of one second printed circuit board respectively. The two parallel strips in the feeding structure 20, the feeding strip 30, and the grounding strips 40 may all be arranged on the second printed circuit boards in a printing manner, which is not particularly limited in this embodiment. It should be noted that a quantity of the second printed circuit boards may be set according to a total quantity of the feeding structure 20, the feeding strip 30, and the grounding strips 40.

The feeding structure 20 including the two parallel strips 21 is used to feed the metal ring structure 50, and a current along the metal ring structure 50 (that is, in a horizontal direction) is generated on the metal ring structure 50, so that an omnidirectional horizontally-polarized wave is generated. Currents with opposite directions and an equal amplitude are generated on the two parallel strips 21, so that radiation of the feeding structure 20 in a vertical direction counteracts each other, to eliminate radiation of the horizontally polarized unit in the vertical direction (that is, a direction perpendicular to the horizontal direction), thereby effectively reducing coupling between the horizontally polarized unit and the vertically polarized unit.

The metal ring structure 50 and the metal disc structure 60 may be arranged on the first printed circuit board 10 in the following two manners.

In the first manner, the metal ring structure 50 and the metal disc structure 60 may be arranged on a same surface of the first printed circuit board 10, and the metal ring structure 50 surrounds the metal disc structure 60.

In the second manner, the metal ring structure 50 and the metal disc structure 60 are arranged on a front side and a rear side of the first printed circuit board 10 respectively, and a projection of the metal disc structure 60 on a plane on which the metal ring structure 50 is positioned is in a hollow region of the metal ring structure 50 (as shown in FIG. 1).

The material of the metal ring structure 50 may include one of silver, copper, gold, aluminum, or metal made of different metal in a predetermined ratio, which is not particularly limited in this embodiment.

Figure 2:
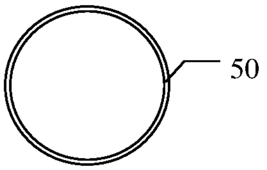
FIG. 2 is a first schematic diagram of a metal ring structure according to an embodiment of this application.
Figure 3:
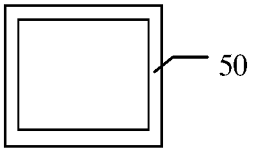
FIG. 3 is a second schematic diagram of a metal ring structure according to an embodiment of this application.
Figure 4:
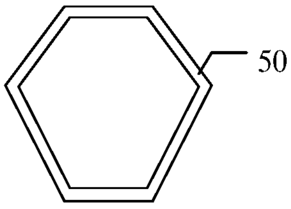
FIG. 4 is a third schematic diagram of a metal ring structure according to an embodiment of this application.

A shape of the metal ring structure 50 may be set according to requirements on a radiation pattern of the omnidirectional horizontally-polarized wave generated by the horizontally polarized unit. Specifically, the shape of the metal ring structure 50 may include a circle, a square, a polygon, an asymmetric shape, or an irregular shape, that is, the metal ring structure 50 may be a circular ring (as shown in FIG. 2), a square ring (as shown in FIG. 3), a polygonal ring (as shown in FIG. 4), a ring in an asymmetric shape, a ring in an irregular shape, or the like, which is not particularly limited in this embodiment. For example, if the shape of the metal ring structure 50 is the asymmetric shape, the metal ring structure 50 may include a first semi-elliptical structure and a second semi-elliptical structure, and a long axis of the first semi-elliptical structure and a short axis of the second semi-elliptical structure coincide. It should be noted that the foregoing ring in the asymmetric shape is only an example, and is not used to limit the present invention. For another example, if the shape of the metal ring structure 50 is the asymmetric shape, the metal ring structure 50 may alternatively include a triangular ring structure and a rectangular ring structure, where a bottom edge of the triangular ring structure and a long edge of the rectangular ring structure are equal and coincident.

The metal ring structure 50 may be arranged on the first printed circuit board 10 in a printing manner, which is not particularly limited in this embodiment.

The metal ring structure 50 may include at least one layer of ring structure. Specifically, the metal ring structure 50 is described in the following two manners.

In the first manner, the metal ring structure 50 includes a first ring structure, that is, the metal ring structure 50 includes one layer of ring structure. The first ring structure may be, for example, a circular ring, a square ring, a polygonal ring, a ring in an asymmetric shape, a ring in an irregular shape, or the like, which is not particularly limited in this embodiment.

On this basis, to make the current along the metal ring structure 50 distributed in equal amplitude and in phase, and to produce better omnidirectional radiation characteristics, the first ring structure may include at least one gap, that is, at least one gap is arranged (that is, loaded) on the first ring structure. A quantity of gaps may be set, which is not particularly limited in this embodiment. When a plurality of gaps are provided, the plurality of gaps may be uniformly arranged on the first ring structure, which is not particularly limited in this embodiment. The gap may be a gap with a rectilinear structure, a gap with a curvilinear structure, a gap with a plurality of right-angle bent structures, or the like, and the shape of the gap is not particularly limited herein. Optionally, the gap described in this specification may be a discontinuous or disconnected structure on the first ring structure, for example, the gap may be implemented by etching away part of metal of the first ring structure.

Figure 5:
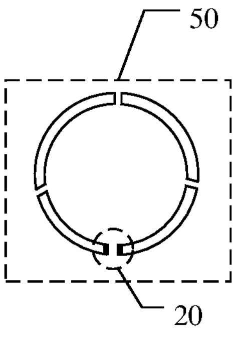
FIG. 5 is a first schematic diagram of a first ring structure including three gaps according to an embodiment of this application.

FIG. 5 is a first schematic diagram of a first ring structure including three gaps according to an embodiment of this application. It may be learned from FIG. 5 that the first ring structure (that is, the metal ring structure 50 in FIG. 5) is a circular ring, the first ring structure includes three gaps, and each gap is a gap with a rectilinear structure.

Figure 6:
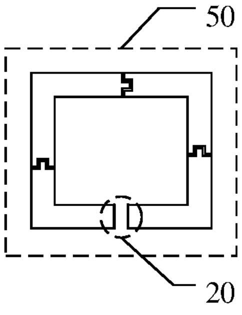
FIG. 6 is a second schematic diagram of a first ring structure including three gaps according to an embodiment of this application.

FIG. 6 is a second schematic diagram of a first ring structure including three gaps according to an embodiment of this application. It may be learned from FIG. 6 that the first ring structure (that is, the metal ring structure 50 in FIG. 6) is a square ring, the first ring structure includes three gaps, and each gap is a gap including four right-angle bent structures.

In the second manner, the metal ring structure 50 includes at least a first ring structure and a second ring structure, that is, the metal ring structure 50 includes at least two layers of ring structures, where the first ring structure is arranged inside the second ring structure. The shape of the first ring structure has already been described above, and details are not described herein again. The second ring structure may be, for example, a circular ring, a square ring, a polygonal ring, a ring in an irregular shape, or the like, which is not particularly limited in this embodiment. It should be noted that the shapes of the first ring structure and the second ring structure may be the same or different, that is, the shape of each layer of ring structure may be the same or different, which is not particularly limited in this embodiment.

For example, the metal ring structure 50 includes a first ring structure and a second ring structure, that is, the metal ring structure 50 includes two layers of ring structures, and the first ring structure is arranged inside the second ring structure. For another example, the metal ring structure 50 includes a first ring structure, a second ring structure, and a third ring structure, that is, the metal ring structure 50 includes three layers of ring structures, the first ring structure is arranged inside the second ring structure, and the second ring structure is arranged inside the third ring structure.

On this basis, the first ring structure and the second ring structure each include a plurality of coupling strips, and a gap is arranged between two adjacent coupling strips. A quantity and lengths of the coupling strips in the first ring structure and a quantity and lengths of the coupling strips in the second ring structure may be set according to actual requirements, which is not particularly limited in this embodiment. The quantity of the coupling strips in the first ring structure may be the same as or different from the quantity of the coupling strips in the second ring structure.

Figure 7:
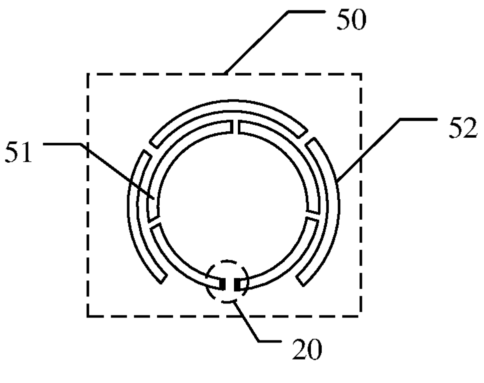
FIG. 7 is a schematic diagram of a metal ring structure with two layers of ring structures according to an embodiment of this application.

FIG. 7 is a schematic diagram of a metal ring structure with two layers of ring structures according to an embodiment of this application. It may be learned from FIG. 7 that the metal ring structure 50 includes a first ring structure 51 and a second ring structure 52, where the first ring structure 51 is arranged inside the second ring structure 52, the first ring structure 51 and the second ring structure 52 each include a plurality of coupling strips, lengths of the coupling strips in the first ring structure 51 are equal, and lengths of the coupling strips in the second ring structure 52 are equal. Optionally, a gap between two adjacent coupling strips in the first ring structure 51 is not aligned with a gap between two adjacent coupling strips in the second ring structure 52. It should be noted that FIG. 7 is only an example, and is not used to limit the present invention. For another example, a gap between two adjacent coupling strips in the first ring structure 51 may alternatively be aligned or partially aligned with a gap between two adjacent coupling strips in the second ring structure 52. By adjusting a position of a gap between two coupling strips, various performances (such as a bandwidth) of the horizontally polarized unit can be adjusted.

The bandwidth of the horizontally polarized unit can be expanded by using a metal ring structure 50 with a plurality of layers of ring structures or a metal ring structure 50 with a plurality of layers of ring structures and having each layer of ring structure including a plurality of coupling strips. In addition, impedance of the horizontally polarized unit is adjusted by adjusting one or more of a layer quantity of the ring structures in the metal ring structure 50, lengths of coupling strips in each ring structure, a distance between coupling strips (that is, a distance between gaps), a quantity of coupling strips, and the like, so as to achieve good impedance and bandwidth matching.

The material of the metal disc structure 60 may include one of silver, copper, gold, aluminum, or metal made of different metal in a predetermined ratio, which is not particularly limited in this embodiment.

The shape of the metal disc structure 60 may include a circle, a square, a polygon, an irregular shape, or the like, which is not particularly limited in this embodiment. The metal disc structure 60 may be a centrosymmetric structure, and by setting the metal disc structure 60 as the centrosymmetric structure, current radiation of the vertically polarized unit in the horizontal direction can completely counteract each other.

The metal disc structure 60 may be arranged on the first printed circuit board 10 in a printing manner, which is not particularly limited in this embodiment.

Because a bandwidth of an antenna is usually defined by a degree of impedance matching, after a gap is loaded on the antenna, from a perspective of electromagnetics, capacitance is added to an equivalent antenna, so that impedance of the antenna becomes lower and smoother, thereby making the antenna implement broadband matching from narrowband matching, to achieve antenna bandwidth expansion. Based on this principle, to further reduce the size of the vertically polarized unit and further optimize impedance of the vertically polarized unit to achieve a larger impedance bandwidth, a manner of loading a gap on the metal disc structure 60 is usually used, which will be specifically described in the following three manners.

Figure 8:
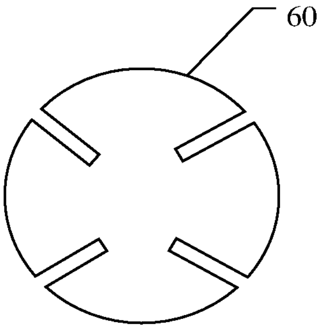
FIG. 8 is a first schematic diagram of a structure of a metal disc structure according to an embodiment of this application.

In the first manner, the metal disc structure 60 is provided with a plurality of gaps. A quantity of the gaps, lengths of the gaps, and positions of the gaps on the metal disc structure may be set based on specific requirements, which is not particularly limited in this embodiment. The gaps may be rectilinear gaps, curvilinear gaps, or the like, which is not particularly limited in this embodiment. FIG. 8 is a first schematic diagram of a structure of a metal disc structure according to an embodiment of this application. It may be learned from FIG. 8 that the shape of the metal disc structure 60 is a circle, and four rectilinear gaps are provided in the metal disc structure 60.

In the second manner, the metal disc structure 60 is provided with an annular gap, the annular gap divides the metal disc structure 60 into a first structure and a second structure, and the first structure surrounds the second structure.

A shape of the second structure includes a circle, a square, a polygon, an irregular shape, or the like, which is not particularly limited in this embodiment. The first structure is a centrosymmetric structure, for example, the shape of the first structure is a circular ring, a square ring, or the like, which is not particularly limited in this embodiment. When the metal disc structure 60 has a plurality of structures, current radiation of the vertically polarized unit in the horizontal direction can completely counteract each other by setting an outermost layer of structure as a centrosymmetric structure.

Based on this, one end of the feeding strip 30 is connected to a point on the second structure, the point is a central point of the first structure, that is, a projection of a connection point of the feeding strip 30 and the second structure on a plane on which the first structure is positioned coincides with the central point of the first structure, and one end of each of the grounding strips 40 is connected to an edge of the first structure.

In the third manner, the metal disc structure 60 is provided with an annular gap, the annular gap divides the metal disc structure 60 into a first structure and a second structure, and the first structure surrounds the second structure. The first structure includes a plurality of coupling strips, a gap is arranged between two adjacent coupling strips, and an edge of each of the coupling strips is connected to one grounding strip 40. A quantity and sizes of the coupling strips in the first structure may be set based on specific requirements, which is not particularly limited herein. The first structure is a centrosymmetric structure. A shape of the second structure includes a circle, a square, a polygon, an irregular shape, or the like.

Based on this, one end of the feeding strip 30 is connected to a point on the second structure, and the point is a central point of the first structure, that is, a projection point of a connection point of the feeding strip 30 and the second structure on a plane on which the first structure is positioned coincides with the central point of the first structure.

Figure 9:
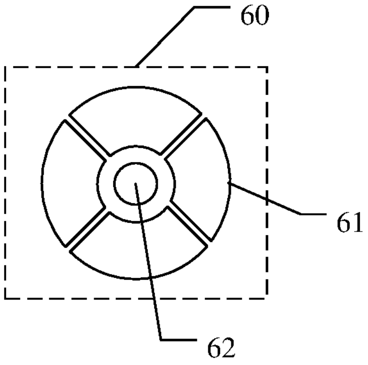
FIG. 9 is a second schematic diagram of a structure of a metal disc structure according to an embodiment of this application.

FIG. 9 is a second schematic diagram of a structure of a metal disc structure according to an embodiment of this application. It may be learned from FIG. 9 that the metal disc structure 60 is provided with an annular gap, and the annular gap divides the metal disc structure 60 into a first structure 61 and a second structure 62. The first structure 61 surrounds the second structure 62. The second structure 62 is circular. The first structure 61 includes four coupling strips, and the four coupling strips are in a same shape. The feeding strip 30 is connected to a central point of the second structure 62, and an edge of each of the coupling strips is connected to one grounding strip 40. Because FIG. 9 is a top view, the feeding strip 30 and the grounding strips 40 are not shown.

Figure 10:
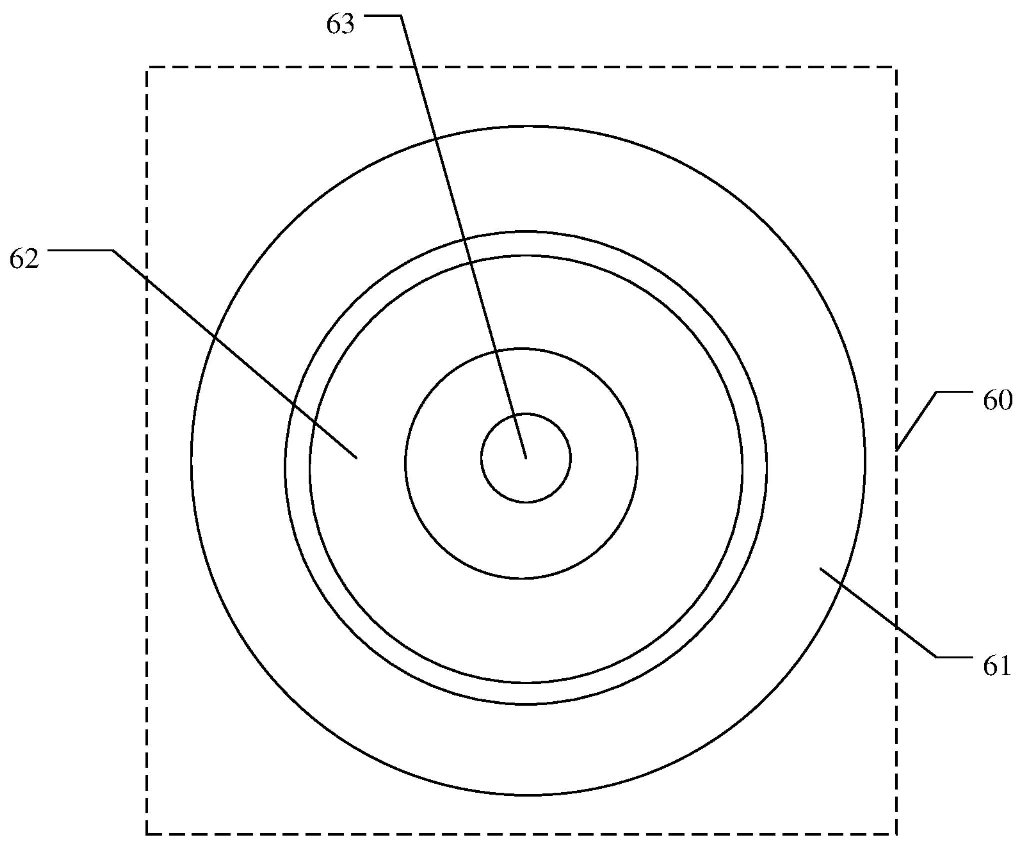
FIG. 10 is a third schematic diagram of a structure of a metal disc structure according to an embodiment of this application.
Figure 11:
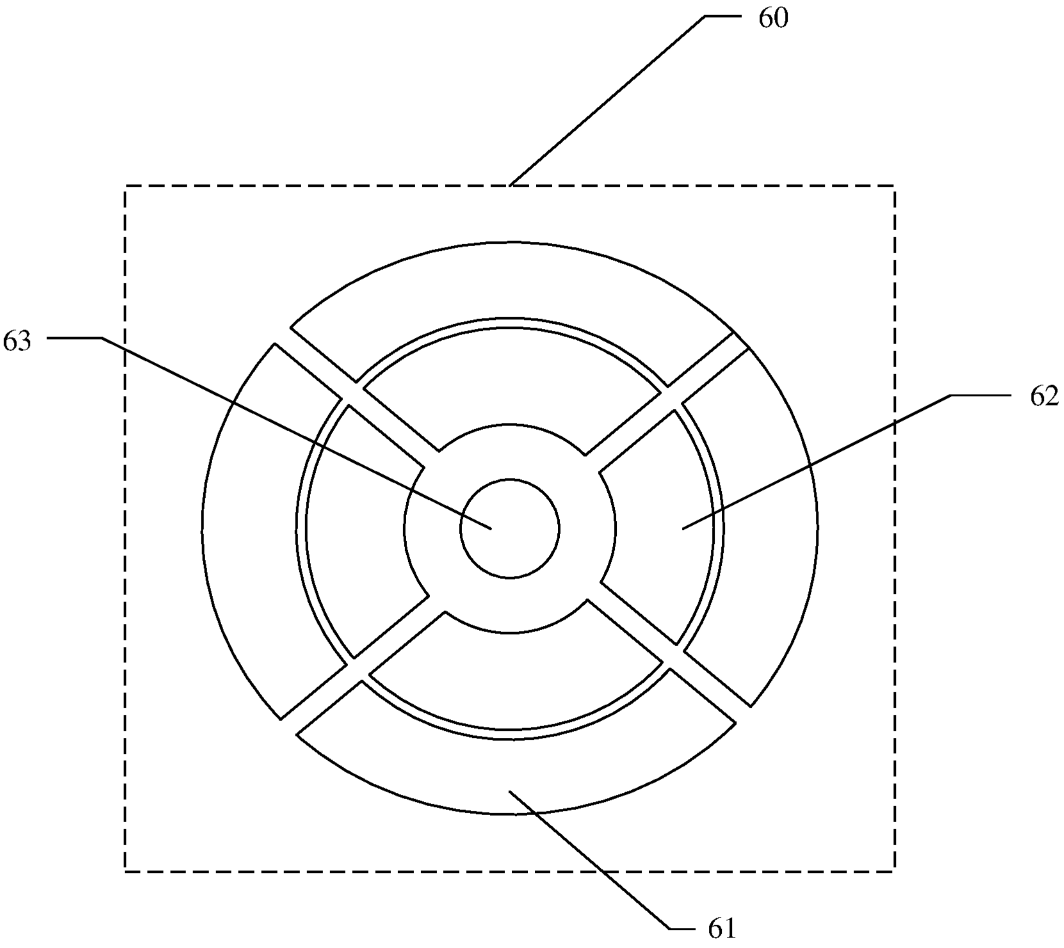
FIG. 11 is a fourth schematic diagram of a structure of a metal disc structure according to an embodiment of this application.

It should be noted that the foregoing three manners are only examples, and are not used to limit this application, that is, this application may alternatively be implemented in other manners. For example, FIG. 10 is a third schematic diagram of a structure of a metal disc structure according to an embodiment of this application. It may be learned from FIG. 10 that the metal disc structure 60 is provided with a first annular gap and a second annular gap, and the first annular gap and the second annular gap divide the metal disc structure 60 into a first structure 61, a second structure 62, and a third structure 63. The first structure 61 surrounds the second structure 62, and the second structure 62 surrounds the third structure 63. The feeding strip 30 is connected to a central point of the third structure 63, and the grounding strip 40 is connected to an edge of the first structure 61. Because FIG. 10 is a top view, the feeding strip 30 and the grounding strips 40 are not shown. For another example, FIG. 11 is a fourth schematic diagram of a structure of a metal disc structure according to an embodiment of this application. It may be learned from FIG. 11 that the metal disc structure 60 is provided with a first annular gap and a second annular gap, and the first annular gap and the second annular gap divide the metal disc structure 60 into a first structure 61, a second structure 62, and a third structure 63. The first structure 61 surrounds the second structure 62, and the second structure 62 surrounds the third structure 63. The first structure 61 includes a plurality of coupling strips, and the second structure 62 includes a plurality of coupling strips. A gap is arranged between two adjacent coupling strips, and an edge of each of the coupling strips in the first structure 61 is connected to one grounding strip 40. The feeding strip 30 is connected to a central point of the third structure 63. Because FIG. 11 is a top view, the feeding strip 30 and the grounding strips 40 are not shown.

It should be noted that the gap herein may be provided on the metal disc structure 60 rather than on the first printed circuit board 10.

It is found through experiments that, compared with an antenna size of $0.65\lambda \times 0.65\lambda \times 0.21\lambda$ in a conventional dual-polarization solution, the antenna size herein is the length, width and height of the antenna, and an entire size of the omnidirectional dual-polarized antenna in this application is only $0.47\lambda \times 0.47\lambda \times 0.117\lambda$, which is reduced by ⅔ compared with the size in the conventional solution, so that it is more easier to integrate more omnidirectional dual-polarized antennas into various communications devices without increasing overall sizes of the communications devices.

This application further provides a communications device. The communications device includes at least one omnidirectional dual-polarized antenna described above. One, two, three, four, or more omnidirectional dual-polarized antennas may be provided. Specifically, a quantity of the omnidirectional dual-polarized antennas may be set based on bandwidth requirements of the communications device. When one omnidirectional dual-polarized antenna is provided, the omnidirectional dual-polarized antenna may be arranged at any corner of the communications device, at a center of the communications device, or the like, which is not particularly limited herein. When a plurality of omnidirectional dual-polarized antennas are provided, the plurality of omnidirectional dual-polarized antennas may be arranged at any corner or a center of the communications device as a whole, or the plurality of omnidirectional dual-polarized antennas may be dispersed at corners of the communications device, which is not particularly limited in this embodiment. For example, if the communications device includes at least four omnidirectional dual-polarized antennas, the at least four omnidirectional dual-polarized antennas are arranged at four corners of the communications device respectively.

Because a layout of the omnidirectional dual-polarized antenna in the communications device has serious impact on performance of the omnidirectional dual-polarized antenna, especially on a radiation pattern of a horizontally polarized unit in the omnidirectional dual-polarized antenna, but has little impact on a radiation pattern of a vertically polarized unit in the omnidirectional dual-polarized antenna, performance of the omnidirectional dual-polarized antenna can be adjusted by adjusting the radiation pattern of the horizontally polarized unit after the omnidirectional dual-polarized antenna is arranged in the communications device.

A manner of adjusting the radiation pattern of the horizontally polarized unit may include: adjusting a shape of a metal ring structure in the horizontally polarized unit and the like based on the impact of the layout of the omnidirectional dual-polarized antenna in the communications device on the radiation pattern of the horizontally polarized unit of the omnidirectional dual-polarized antenna, to change distribution of a current on the metal ring structure along the ring, so as to adjust the radiation pattern of the horizontally polarized unit from the source. Specifically, the metal ring structure in the horizontally polarized unit may be adjusted as a structure with an irregular shape such as a polygon or a special shape.

Figure 12A:
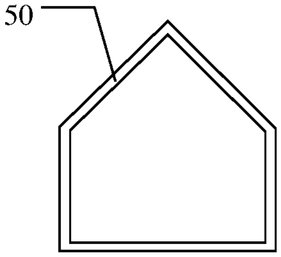
FIG. 12*a* is a schematic diagram of a first structure of a metal ring structure according to an embodiment of this application.
Figure 12B:
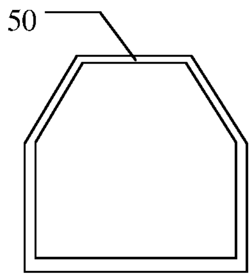
FIG. 12*b* is a schematic diagram of a second structure of a metal ring structure according to an embodiment of this application.
Figure 12C:
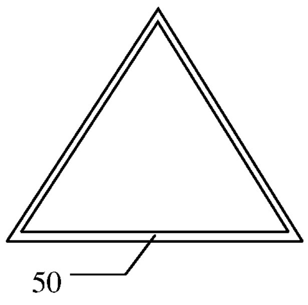
FIG. 12C is a schematic diagram of a third structure of a metal ring structure according to an embodiment of this application.
Figure 12D:
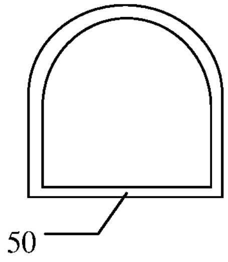
FIG. 12*d* is a schematic diagram of a fourth structure of a metal ring structure according to an embodiment of this application.

For example, FIG. 12*a* is a schematic diagram of a first structure of a metal ring structure according to an embodiment of this application. A metal ring structure 50 in FIG. 12*a* includes a triangular ring structure and a rectangular ring structure, where a bottom edge of the triangle is equal to a long edge of the rectangle. FIG. 12*b* is a schematic diagram of a second structure of another metal ring structure according to an embodiment of this application. A metal ring structure 50 in FIG. 12*b* includes a trapezoidal ring structure and a rectangular ring structure, where a bottom edge of the trapezoid is equal to a long edge of the rectangle. FIG. 12*c* is a schematic diagram of a third structure of still another metal ring structure according to an embodiment of this application. A metal ring structure 50 in FIG. 12*c* is a triangular ring structure. FIG. 12*d* is a schematic diagram of a fourth structure of still yet another metal ring structure according to an embodiment of this application. A metal ring structure 50 in FIG. 12*d* includes a semicircular ring structure and a rectangular ring structure, where a radius of the semicircular ring structure is equal to a long edge of the rectangular ring structure.

Adjustment of performance of the omnidirectional dual-polarized antenna is described below in combination with a specific layout of the omnidirectional dual-polarized antenna in a communications device.

Figure 13:
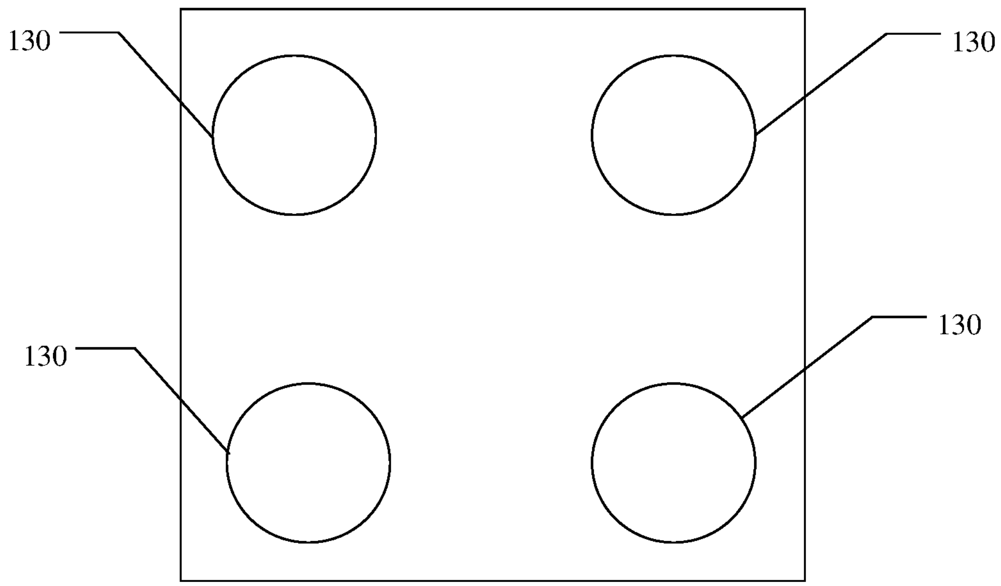
FIG. 13 is a schematic diagram of a layout of an omnidirectional dual-polarized antenna on a communications device according to an embodiment of this application.
Figure 14:
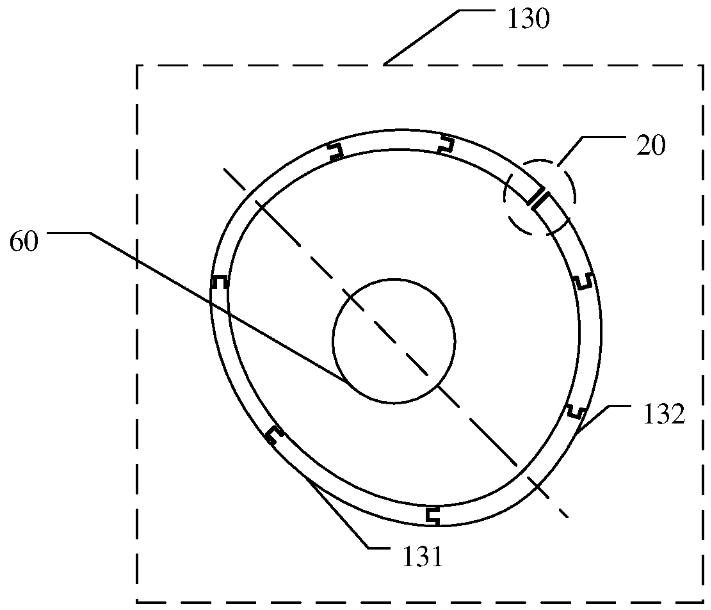
FIG. 14 is a schematic diagram of a structure of a metal ring structure according to an embodiment of this application.

FIG. 13 is a schematic diagram of a layout of an omnidirectional dual-polarized antenna on a communications device according to an embodiment of this application. It may be learned from FIG. 13 that the communications device includes four omnidirectional dual-polarized antennas 130 arranged at four corners thereof. When the omnidirectional dual-polarized antennas 130 are arranged at the corners of the communications device, a horizontally polarized unit in the omnidirectional dual-polarized antenna is affected by an asymmetric metal component (such as system ground), and roundness of a radiation pattern of the horizontally polarized unit deteriorates. As a result, omnidirectional radiation characteristics are weakened. Therefore, the radiation pattern of the horizontally polarized unit can be adjusted by adjusting a shape of a metal ring structure in the horizontally polarized unit. Specifically, FIG. 14 is a schematic diagram of a structure of a metal ring structure according to an embodiment of this application. It may be learned from FIG. 14 that the metal ring structure in an omnidirectional dual-polarized antenna includes a first semi-elliptical structure 131 and a second semi-elliptical structure 132, and a long axis of the first semi-elliptical structure 131 and a short axis of the second semi-elliptical structure 132 coincide. That is, the metal ring structure may be seen as a combination of two semi-elliptical rings. The short axis of the semi-elliptical ring (that is, the second semi-elliptical structure 132) on the upper right side of the dashed line coincides with the dashed line, the long axis of the semi-elliptical ring (that is, the first semi-elliptical structure 131) on the lower left side of the dashed line coincides with the dashed line, and the short axis of the semi-elliptical ring on the upper right side of the dashed line is equal to the long axis of the semi-elliptical ring on the lower left side of the dashed line. By adjusting the long axes and the short axes of the two semi-elliptical structures, current distribution on the metal ring structure is improved, thereby optimizing the roundness of the radiation pattern of the horizontally polarized unit, strengthening the omnidirectional radiation characteristics, and further optimizing performance of the omnidirectional dual-polarized antenna.

It should be noted that the foregoing manners of adjusting the performance of the omnidirectional dual-polarized antenna are only examples, and are not used to limit the present invention. Specifically, in practical application, manners of adjusting the performance of the omnidirectional dual-polarized antenna can be determined based on impact of the layout of the omnidirectional dual-polarized antenna in the communications device on the omnidirectional dual-polarized antenna.

The communications device may be an indoor base station, a vehicle-mounted communications device, or the like, which is not particularly limited in this embodiment.

Because the size of the omnidirectional dual-polarized antenna is relatively small, it is easier to integrate more omnidirectional dual-polarized antennas into various communications devices without increasing entire sizes of the communications devices. In addition, when a same quantity of transceiving channels are implemented in the communications device, a quantity of omnidirectional dual-polarized antennas in this application is reduced by a half compared with a quantity of antennas using single ports, thereby reducing costs of the communications device.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An antenna, comprising: a first printed circuit board, a feeding structure, a feeding strip, and grounding strips, wherein a metal ring structure and a metal disc structure are arranged on the first printed circuit board, and the metal ring structure surrounds the metal disc structure;

the feeding structure is perpendicular to the first printed circuit board and connected to the metal ring structure;

the feeding strip is perpendicular to the first printed circuit board and connected to a central point of the metal disc structure;

the grounding strips are each perpendicular to the first printed circuit board and connected to the metal disc structure; and the metal ring structure and the feeding structure form a horizontally polarized unit, and the metal disc structure, the feeding strip, and the grounding strips form a vertically polarized unit.

2. The antenna according to claim 1, wherein the antenna further comprises a plurality of second printed circuit boards, and the plurality of second printed circuit boards are perpendicular to the first printed circuit board, and wherein the feeding structure is arranged on a first second printed board of the plurality of second printed circuit boards, the feeding strip is arranged on a second second printed board of the plurality of second printed circuit boards, and the grounding strips are arranged on a third second printed board of the plurality of second printed circuit boards other than the first second printed board and the second second printed board of the plurality of second printed circuit boards.

3. The antenna according to claim 1, wherein the feeding structure comprises two parallel strips, one of the two parallel strips is configured to be used for feeding the metal ring structure, and the other one of the two parallel strips is configured to be used for grounding.

4. The antenna according to claim 1, wherein the metal ring structure comprises a first ring structure, and at least one gap extends in the first ring structure.

5. The antenna according to claim 1, wherein the metal ring structure comprises a first ring structure and a second ring structure, wherein the first ring structure is arranged inside the second ring structure, the first ring structure and the second ring structure each comprise a plurality of coupling strips, and a gap is arranged between two adjacent coupling strips.

6. The antenna according to claim 5, wherein the plurality of coupling strips of the first ring structure have a same length, and the plurality of coupling strips of the second ring structure have a same length.

7. The antenna according to claim 1, wherein a shape of the metal ring structure comprises a circle, a square, a polygon, an asymmetric shape, or an irregular shape.

8. The antenna according to claim 7, wherein the shape of the metal ring structure is the asymmetric shape, and the metal ring structure comprises a first semi-elliptical structure and a second semi-elliptical structure, and a major axis of the first semi-elliptical structure and a minor axis of the second semi-elliptical structure coincide.

9. The antenna according to claim 1, wherein a plurality of gaps extend in the metal disc structure.

10. The antenna according to claim 1, wherein an annular gap extends in the metal disc structure, the annular gap divides the metal disc structure into a first structure and a second structure, and the first structure surrounds the second structure.

11. The antenna according to claim 10, wherein a shape of the first structure comprises a circular ring or a square ring, and a shape of the second structure comprises a circle, a square, a polygon, or an irregular shape.

12. The antenna according to claim 11, wherein one end of the feeding strip is connected to a point on the second structure, the point is a central point of the first structure, and one end of each of the grounding strips is connected to an edge of the first structure.

13. The antenna according to claim 10, wherein the first structure comprises a plurality of coupling strips, a gap is arranged between two adjacent coupling strips, and an edge of each of the coupling strips is connected to one grounding strip.

14. A communications device, comprising an omnidirectional dual-polarized antenna, wherein the omnidirectional dual-polarized antenna comprises:

a first printed circuit board, a feeding structure, a feeding strip, and grounding strips, wherein a metal ring structure and a metal disc structure are arranged on the first printed circuit board, and the metal ring structure surrounds the metal disc structure;

the feeding structure is perpendicular to the first printed circuit board and connected to the metal ring structure;

the feeding strip is perpendicular to the first printed circuit board and connected to a central point of the metal disc structure;

the grounding strips are each perpendicular to the first printed circuit board and connected to the metal disc structure; and the metal ring structure and the feeding structure form a horizontally polarized unit, and the metal disc structure, the feeding strip, and the grounding strips form a vertically polarized unit.

15. The communications device according to claim 14, wherein the omnidirectional dual-polarized antenna further comprises a plurality of second printed circuit boards, and the plurality of second printed circuit boards are perpendicular to the first printed circuit board, and wherein the feeding structure is arranged on a first second printed board of the plurality of second printed circuit boards, the feeding strip is arranged on a second second printed board of the plurality of second printed circuit boards, and the grounding strips are arranged on a third second printed board of the plurality of second printed circuit boards other than the first second printed board and the second second printed board of the plurality of second printed circuit boards.

16. The communications device according to claim 14, wherein the feeding structure comprises two parallel strips, one of the two parallel strips is used for feeding the metal ring structure, and the other one of the two parallel strips is used for grounding.

17. The communications device according to claim 14, wherein the metal ring structure comprises a first ring structure, and at least one gap extends in the first ring structure.

18. The communications device according to claim 14, wherein the metal ring structure comprises a first ring structure and a second ring structure, wherein the first ring structure is arranged inside the second ring structure, the first ring structure and the second ring structure each comprise a plurality of coupling strips, and a gap is arranged between two adjacent coupling strips.

19. The communications device according to claim 18, wherein the plurality of coupling strips of the first ring structure have a same length, and the plurality of coupling strips of the second ring structure have a same length.

20. The communications device according to claim 14, wherein the communications device comprises at least four omnidirectional dual-polarized antennas, and the at least four omnidirectional dual-polarized antennas are arranged at four corners of the communications device respectively.

* * * * *